April 1, 1924.　　　　　　　　　　　　　　　1,488,936
F. R. PARKER

HIGH POTENTIAL ELECTRICITY ARRESTER ELECTRODE

Original Filed May 8, 1916

Inventor:
Frederick R. Parker

Patented Apr. 1, 1924.

1,488,936

UNITED STATES PATENT OFFICE.

FREDERICK R. PARKER, OF CHICAGO, ILLINOIS.

HIGH-POTENTIAL ELECTRICITY-ARRESTER ELECTRODE.

Original application filed May 8, 1916, Serial No. 96,066. Divided and this application filed January 3, 1921. Serial No. 434,414.

*To all whom it may concern:*

Be it known that I, FREDERICK R. PARKER, a citizen of the United States of America, residing at Chicago, in the county of Cook and State of Illinois, have invented new and useful High-Potential Electricity-Arrester Electrodes, of which the following is a specification, reference being had to the accompanying drawings, illustrating two embodiments of the invention.

This application is a division of my United States patent application Serial No. 96,066, filed May 8, 1916, on voltaic cell and electrode, which issued into Patent No. 1,366,095, on Jan. 18, 1921.

A modified form of the invention herein set forth is utilized in the invention set forth in my United States Letters Patent No. 1,468,574, on voltaic cell.

My invention relates to high-potential electricity arresters and in particular to electrodes therefor.

The principal objects of my invention are, to provide improved electrodes for various electricity arresters, especially for high-potential electricity arresters, as herein set forth; to provide improved electricity arrester electrodes having high conductivity and a carbonaceous discharge surface or portion; to provide a metallic electricity arrester electrode portion with a carbonaceous discharge surface or portion; to provide a carbonaceous discharge surface or portion of an electricity arrester electrode with a backing of high conductivity, preferably of metal; to provide an improved carbonaceous covering for a metallic electricity arrester electrode; to provide an improved carbonaceous discharge surface or portion in an electricity arrester electrode; and to provide improved means for securing the carbonaceous covering to the metallic backing in electricity arrester electrodes. Other objects will be apparent from the following disclosure of this invention.

Figure 1:
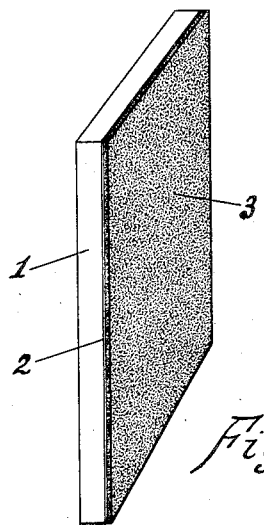
Figure 2:
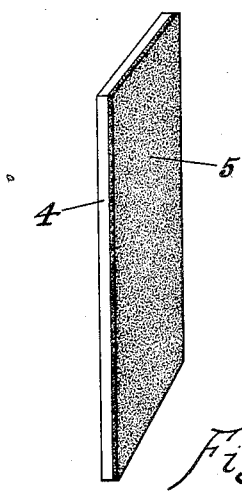

On the accompanying sheet of drawings, Figure 1 is a perspective view of one form of electricity arrester electrode embodying my invention; and Fig. 2 is a perspective view of another form of electricity arrester electrode embodying a modified form of the invention disclosed in Fig. 1.

My improved electrode of this invention comprises, in its preferred forms, a metallic portion 1 (or 4) covered on its active or discharge surface with carbonaceous material 3 (or 5). The carbonaceous material 3 (or 5) is preferably impervious to moisture, so that it will not absorb or retain moisture which might be detrimental in certain kinds of electricity arresters. The metallic portion (or 4) of the electrode, may be of various shapes and sizes, and of any suitable metal or alloy of metals, and it may, in some instances, be replaced by other suitable material. One of the functions of the portion 1 (or 4) is to provide a support or backing for the carbonaceous covering 3 (or 5), and another of its functions is to provide a good conductor extending from every portion of the carbonaceous covering 3 (or 5). I may make the metallic portion 1 (or 4) of copper, brass, aluminum, zinc, bronze, cold-rolled steel, or various other metals. For an electrode of high conductivity I preferably use copper for the portion 1 (or 4), and for a cheap electrode of fair conductivity, as well as for one where strength and rigidity are required, as in a rather thin electrode, I preferably use cold-rolled steel electroplated with copper. The electroplating on the metallic portion of the electrode, shown at 2 in Fig. 1, is of advantage because it presents a rough surface to the carbonaceous covering 3, which covering holds more securely thereto than to a smooth surface. In Fig. 2, the carbonaceous covering 5 is applied directly to the metallic portion 4. This form of the invention may be used where a cheaper electrode is required.

For the carbonizing covering for the metallic portion 1 (or 4) of the electrode, I preferably use a carbonaceous material such as powdered graphite, carbon dust, powdered charcoal which has been well burned, or other carbonaceous materials, mixed with an adhesive nonconducting material which is preferably impervious to moisture. For such an adhesive impervious material I preferably use a good insulating and waterproof varnish or enamel, or a good grade of shellac, or both, or I may use suitable glues, gums, waxes, cements, paraffine, asphaltum, or other suitable materials, or combinations thereof. I preferably mix the carbonaceous material with the adhesive material so as to form a rather thin mixture, and let this mixture stand until every particle of the carbonaceous material is thoroughly penetrated by the adhesive material or a component part thereof so that there will be no possibility of moisture soaking into or through the particles of the carbonaceous material. I may then apply the mixed carbonizing material 3 (or 5) to the metallic portion of the electrode with a brush, or by dipping, or by spraying it onto the metallic portion. I may use a carbonizing material which is air-drying, or a material which must be baked after being applied. I may also use one or a number of coats of the carbonizing material on the metallic portion of the electrode. I have found that two coats, and even one coat, gives very satisfactory results. In applying the carbonizing material with a brush or by dipping, it should be free from air bubbles, which, upon breaking, would leave holes in the carbonizing covering.

I preferably polish or dress down the carbonized surface 3 (or 5) of the electrode, to remove the exposed adhesive non-conducting material and provide a smoother or evener surface of higher conductivity.

I wish it to be understood that my carbonized electrodes or portions, constructed as above set forth, may be used for various purposes besides for electricity arrester electrodes, and in place of various carbon or graphite parts. They will not break as ordinary carbon will, and may be made thin enough so as to be somewhat flexible. They are also of higher conductivity than ordinary carbon electrodes or parts. If desired, the carbonizing covering 3 (or 5) may extend over the whole of the metallic portion 1 (or 4).

I wish it to be understood that I do not desire to limit this invention to the particular details of construction, nor to the particular materials, herein set forth, as various modifications thereof may be made or utilized without departing from the scope of the appended claims. I also wish it to be understood that the several features of this invention may be used either singly or collectively without departing from the scope of the appended claims.

What I claim herein as my invention is:

1. A high-potential electricity arrester electrode comprising a metallic portion electroplated with metal and having a covering over the electroplating comprising a mixture of carbonaceous material and adhesive non-conducting material impervious to moisture, the exposed surface of the said covering being polished.

2. A high-potential electricity arrester electrode comprising a metallic portion electroplated with metal and having a covering over the electroplating comprising a mixture of carbonaceous material and adhesive non-conducting material, the exposed surface of the said covering being polished.

3. A high-potential electricity arrester electrode comprising a metallic portion electroplated with metal and having a covering over the electroplating comprising a mixture of carbonaceous material and adhesive material, the exposed surface of the said covering being polished.

4. An electricity arrester electrode comprising a metallic portion electroplated with metal and having a covering of carbonaceous material over the electroplating, the exposed surface of the said covering being polished.

5. An electricity arrester electrode comprising a conducting portion electroplated with metal and having a covering of carbonaceous material over the electroplating, the exposed surface of the said covering being polished.

6. A high-potential electricity arrester electrode comprising a metallic portion electroplated with metal and having a covering over the electroplating comprising a mixture of carbonaceous material and adhesive non-conducting material impervious to moisture, the exposed surface of the said covering being dressed down whereby the exterior of the said non-conducting material is removed.

7. A high-potential electricity arrester electrode comprising a metallic portion electroplated with metal and having a covering over the electroplating comprising a mixture of carbonaceous material and adhesive non-conducting material, the exposed surface of the said covering being dressed down whereby the exterior of the said non-conducting material is removed.

8. A high-potential electricity arrester electrode comprising a metallic portion electroplated with metal and having a covering over the electroplating comprising a mixture of carbonaceous material and adhesive material, the exposed surface of the said covering being dressed down whereby the exterior of the said adhesive material is removed.

9. An electricity arrester electrode comprising a metallic portion electroplated with metal and having a covering of carbonaceous material over the electroplating, the exposed surface of the said covering being dressed down.

10. An electricity arrester electrode comprising a conducting portion electroplated with metal and having a covering of carbonaceous material over the electroplating, the exposed surface of the said covering being dressed down.

11. A high-potential electricity arrester electrode comprising a metallic portion electroplated with metal and having a covering over the electroplating comprising a mixture of carbonaceous material and adhesive non-conducting material impervious to moisture.

12. A high-potential electricity arrester electrode comprising a metallic portion electroplated with metal and having a covering over the electroplating comprising a mixture of carbonaceous material and adhesive non-conducting material.

13. A high-potential electricity arrester electrode comprising a metallic portion electroplated with metal and having a covering over the electroplating comprising a mixture of carbonaceous material and adhesive material.

14. An electricity arrester electrode comprising a metallic portion electroplated with metal and having a covering of carbonaceous material over the electroplating.

15. An electricity arrester electrode comprising a conducting portion electroplated with metal and having a covering of carbonaceous material over the electroplating.

16. A high-potential electricity arrester electrode comprising a metallic portion having a covering comprising a mixture of carbonaceous material and adhesive non-conducting material impervious to moisture, the exposed surface of the said covering being polished.

17. A high-potential electricity arrester electrode comprising a metallic portion having a covering comprising a mixture of carbonaceous material and adhesive non-conducting material, the exposed surface of the said covering being polished.

18. A high-potential electricity arrester electrode comprising a metallic portion having a covering comprising a mixture of carbonaceous material and adhesive material, the exposed surface of the said covering being polished.

19. An electricity arrester electrode comprising a metallic portion having a covering of carbonaceous material, the exposed surface of the said covering being polished.

20. An electricity arrester electrode comprising a conducting portion having a covering of carbonaceous material, the exposed surface of the said covering being polished.

21. A high-potential electricity arrester electrode comprising a metallic portion having a covering comprising a mixture of carbonaceous material and adhesive non-conducting material impervious to moisture, the exposed surface of the said covering being dressed down whereby the exterior of the said non-conducting material is removed.

22. A high-potential electricity arrester electrode comprising a metallic portion having a covering comprising a mixture of carbonaceous material and adhesive non-conducting material, the exposed surface of the said covering being dressed down whereby the exterior of the said non-conducting material is removed.

23. A high-potential electricity arrester electrode comprising a metallic portion having a covering comprising a mixture of carbonaceous material and adhesive material, the exposed surface of the said covering being dressed down whereby the exterior of the said adhesive material is removed.

24. An electricity arrester electrode comprising a metallic portion having a covering of carbonaceous material, the exposed surface of the said covering being dressed down.

25. An electricity arrester electrode comprising a conducting portion having a covering of carbonaceous material, the exposed surface of the said covering being dressed down.

26. A high-potential electricity arrester electrode comprising a metallic portion having a covering comprising a mixture of carbonaceous material and adhesive non-conducting material impervious to moisture.

27. A high-potential electricity arrester electrode comprising a metallic portion having a covering comprising a mixture of carbonaceous material and adhesive non-conducting material.

28. A high-potential electricity arrester electrode comprising a metallic portion having a covering comprising a mixture of carbonaceous material and adhesive material.

29. An electricity arrester electrode comprising a metallic portion having a covering of carbonaceous material.

30. An electricity arrester electrode comprising a conducting portion having a covering of carbonaceous material.

As inventor of the foregoing I hereunto subscribe my name, this 24th day of December, 1920.

FREDERICK R. PARKER.